United States Patent [19]

Nilsson

[11] Patent Number: 4,629,638

[45] Date of Patent: Dec. 16, 1986

[54] METHOD FOR THE MANUFACTURE OF SHEETLIKE OR WEBLIKE MATERIAL PROVIDED WITH MARKINGS BECOMING APPARENT IN TRANSMITTED LIGHT

[75] Inventor: Ingvar Nilsson, Åkarp, Sweden

[73] Assignee: Suecia Antiqua Limited, London, England

[21] Appl. No.: 655,716

[22] Filed: Sep. 28, 1984

[51] Int. Cl.$^4$ ............................................. B41M 3/10
[52] U.S. Cl. ...................................... 428/29; 156/277; 428/187; 428/204; 428/211; 428/900
[58] Field of Search ................. 428/29, 187, 204, 211, 428/513, 900, 916; 156/277

[56] References Cited

U.S. PATENT DOCUMENTS

| | | | |
|---|---|---|---|
| 1,818,459 | 8/1931 | Bryan | 156/277 X |
| 2,656,297 | 10/1953 | Davis, Jr. et al. | 428/462 X |
| 2,675,339 | 4/1954 | Zenftman | 428/246 |
| 2,801,198 | 7/1957 | Morris et al. | 156/277 X |
| 3,081,214 | 3/1963 | Strome | 428/187 X |
| 3,196,031 | 7/1965 | Unmuth | 428/513 X |
| 3,288,628 | 11/1966 | Schur et al. | 428/211 |
| 3,684,643 | 8/1972 | Stepp | 428/513 X |
| 3,730,757 | 5/1973 | Knorre | 427/307 X |
| 3,985,927 | 10/1976 | Norris et al. | 428/211 |
| 4,199,638 | 4/1980 | McKee | 428/131 |
| 4,496,961 | 1/1985 | Devrient | 428/201 X |
| 4,511,616 | 4/1985 | Pitts et al. | 428/204 X |

*Primary Examiner*—Henry F. Epstein
*Attorney, Agent, or Firm*—Burns, Doane, Swecker & Mathis

[57] ABSTRACT

The invention relates to a method for the manufacture of sheetlike or weblike material which is the carrier of markings apparent in transmitted light. The markings being produced in that sheets or webs of paper with marking of the desired type printed onto them are laminated to one another with the print-carrying surfaces facing towards one another and that the lamination is carried out with a thin plastic layer.

12 Claims, 4 Drawing Figures

METHOD FOR THE MANUFACTURE OF SHEETLIKE OR WEBLIKE MATERIAL PROVIDED WITH MARKINGS BECOMING APPARENT IN TRANSMITTED LIGHT

BACKGROUND AND SUMMARY OF THE INVENTION

The present invention relates to a method for the manufacture of sheetlike or weblike material, in particular writing paper or document paper, provided with markings detectable or becoming visually apparent in transmitted light or by the penetration of rays. The invention also relates to sheetlike or weblike material manufactured in accordance with the method. It has long been known that writing and document paper can be provided with so-called water marks. Such water marks in principle are invisible but become clearly apparent when the sheet of paper is held up against the light or light is transmitted through it in some other way. The water marks are traditionally produced by means of impressions in, or simple touching of, the strongly aqueous paper pulp distributed over the endless wire of the paper machine. The operation of producing the water marks is carried out with the help of a so-called dandy roll.

Such water marks are expensive to produce when the quantities of water-marked material to be manufactured are not very large so that it is rarely economically justifiable to provide e.g. private writing paper with special water marks.

There is a possibility, however, to produce so-called false water marks by chemical methods. These "water marks" are produced by locally modifying the optical refractive index through applying a chemical compound, often a polymerizable substance, in the desired pattern. However, it has been found that these "false water marks" in general are often visible in light other than transmitted light and that they give the impression of the paper having been marked by a "grease stain". A further possibility consists in altering the light transmitting capacity of the paper by machining portions of the paper surface so as to thin the paper in a pattern corresponding to the text or images. However, such a mechanical processing of the paper surface gives clearly visible traces which are distinctly apparent even without any light transmission. The abovementioned methods are subject to inconveniences which are eliminated by the present invention which is characterized in that the desired markings of the water mark type are arranged between two sheets or webs joined to one another.

BRIEF DESCRIPTION OF THE DRAWINGS

In the following the invention will be described with the help of the attached schematic drawing, wherein.

DETAILED DESCRIPTION OF THE PREFERRED EMBODIMENT

An indirect apparent marking of the water mark type paper has been made use of for a long time in order to provide a legitimacy check for documents and securities such as bank-notes, share warrants etc., but marking of this type has also been used for identification of the manufacturer of a paper on company stationery and to a limited extent for private writing paper, and in the most part for handmade paper. The reason why marking of machinemade private paper with water mark fails to be economically justifiable is that it is hardly profitable by means of present methods prior to the present invention to manufacture less than 10 tons of paper with the same marking.

With the help of the method in accordance with the present invention, however, it is possible in an economic manner to manufacture private writing paper, company stationery and document paper in considerably smaller quantities than if traditional water marking were to be used.

It is another advantage that marking can be located on the individual sheets of paper with considerably greater accuracy and that the contours of the marking will be more distinct.

Figure 1:
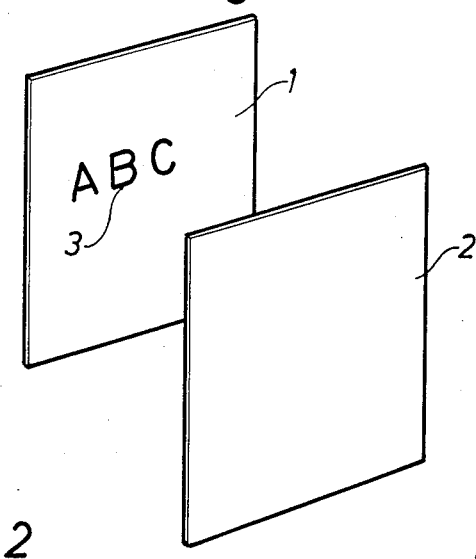
FIG. 1 shows two sheets of paper intended to be laminated to one another.
Figure 2:
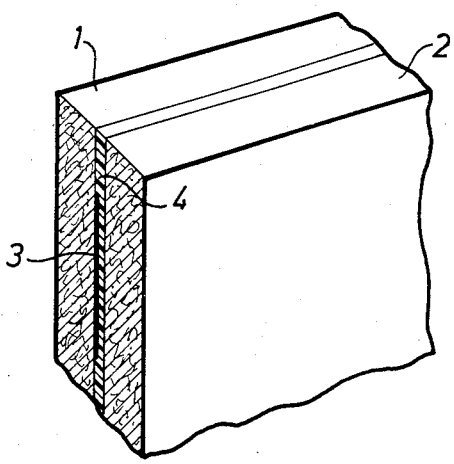
FIG. 2 shows a enlarged cross-section through a laminate in accordance with the invention comprising two paper layers.

In the attached FIG. 1 are shown two sheets of paper 1 and 2, of which sheet 1 has been provided with a printed marking 3. This marking can be in the form of a text, an image or combinations of both and may be done, e.g. in color printing. Furthermore, both paper layers may be provided with print if required. It is important, though, that the printed surfaces of the sheets 1,2 are facing one another and are laminated to one another so that one sheet is formed of both of the sheets 1 and 2. In FIG. 2 is shown a cross-section of a laminate of the type described and, as is evident from the drawing, the paper sheets 1 and 2 have been joined together by means of a thin bonding layer 4 which may be constituted, for example, of polyethylene, applied by means of extrusion in a thickness of layer of 5–20 g/m$^2$. As can be seen from the figure, the printed marking 3 will be located between the two paper layers 1 and 2 so that the marking is scarcely perceptible when the ready-laminated sheet rests on a dark base or in some other manner is handled so that it is not subjected to light transmission. In contrast, if the sheet is placed in transmitted light, the marking 3 becomes distinctly visible.

Figure 3:
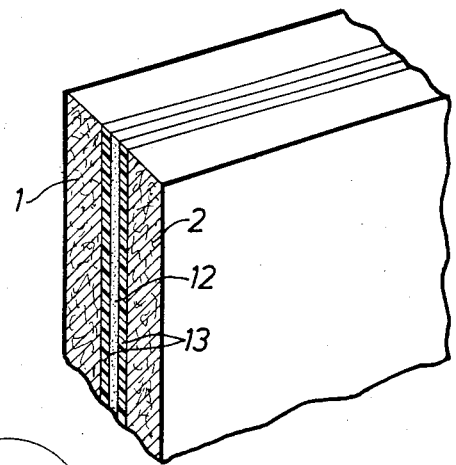
FIG. 3 shows a laminate in accordance with the invention comprising two outer paper layers and a central layer carrying the marking.

In FIG. 3 is shown a variant of the invention. In this variant the two outer paper layers 1 and 2 are not provided with any printed marking but instead a separate, preferably transparent, thin layer 12 is the carrier of the desired marking, and this central layer 12 is laminated to the interior of the outer paper layers 1 and 2 with the help of thin extruded plastic layers 13 or by means of an adhesive. The central layer 12 advantageously may be constituted, for example, of a transparent plastic film which is provided with the desired marking by printing. In combination with the visually observable marking mentioned here, it is conceivable that optically readable, non-transparent markings or magnetic markings readable by electric methods may be provided in cases where the material in accordance with the invention is to be used for legitimacy checks.

In order that the markings on the layer 12 are invisible when the material is not in transmitted light, the paper layers 1 and 2 in general must be provided with a certain inking and especially a certain reflectivity. The inking must not be so strong, of course, that the laminate becomes non-transparent. However, compromise has to be made so that a laminate is obtained in which the marking is apparent only to a small degree or not at all when the laminate is not in transmitted light but which is clearly discernible when the laminate is subjected to light transmission.

Figure 4:
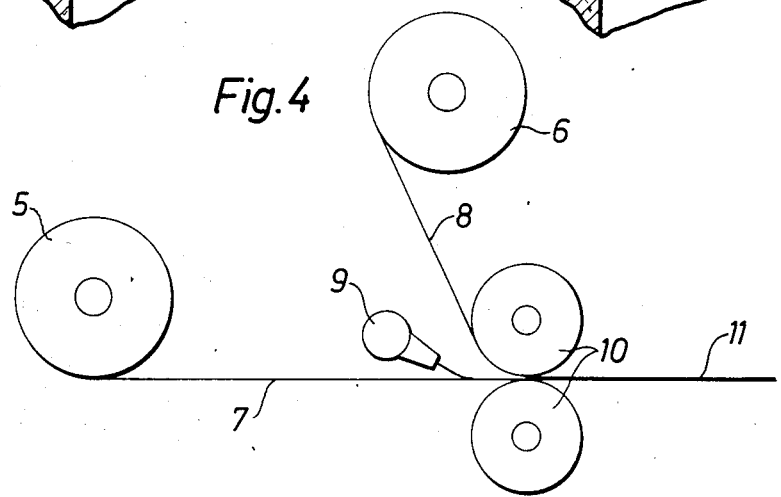
FIG. 4 shows a schematic sketch of an arrangement for the manufacture of a material in accordance with the invention.

The laminated material in accordance with the invention is preferably manufactured in the manner as shown in FIG. 4. In this schematic drawing two magazine rolls of weblike paper material are designated 5 and 6, one or both of the webs 7 and 8 having been provided in advance with printed markings. The webs 7 and 8 are brought together between cooled press rollers 10, and in front of the rollers 10 an extruder 9 is arranged through which a thin layer of molten plastic material, preferably polyethylene, is pressed out and is brought onto the web 7. The extruded bonding layer of plastics is applied to the web 7 along its whole width in a thin uniform layer and when, directly after the application of the plastics, the webs 7 and 8 are brought together and compressed between the rollers 10 with simultaneous cooling, the webs 7 and 8 will be combined in a laminate 11 with the desired printed marking being located in the center of the laminate between the two layers 7 and 8 laminated together. It has been found that by means of the method in accordance with the invention clear and distinct markings of the "water mark type" can be achieved at relatively low cost, and it has been found moreover that the method in accordance with the invention also offers greater freedom inasfar as the choice of appearance, color and location of the markings is concerned.

The invention can be used advantageously in the production of deeds which have to be readily checkable with, respect to their authenticity, that is to say cheques, identification documents, permits etc. As the marking can be easily read against a lit surface, e.g. a light table, the legitimacy or authenticity of documents can be readily checked, and as the text is present inside the laminate from which the document is made, the text cannot be altered without the document being destroyed.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A method of manufacturing paper provided with markings which become visible upon transmission of light through said paper, comprising the steps of:
   providing a first roll of paper material in the form of a first web;
   providing a second roll of paper material in the form of a second web;
   marking at least one of the first and second webs with the markings;
   arranging the first and second webs in facing relationship to each other;
   providing the markings in an area defined between said first and second webs;
   extruding a layer of molten plastic material on one of the first and second webs; and
   compressing the first and second webs with the plastic material therebetween to each other so as to provide a laminated paper web with the marking therebetween.

2. A method in accordance with claim 1, including:
   applying the markings to a surface of both of said two paper webs so that the markings are between the two paper webs upon joining of the webs.

3. A method in accordance with claim 1, including:
   applying the markings by printer.

4. A method in accordance with claim 1, including:
   applying the markings on a transparent material layer;
   arranging the material layer between said two paper webs; and
   laminating the material layer with the two paper webs.

5. A method in accordance with claim 4, further including:
   arranging plastic layers on both sides of said material layer; and
   joining said two paper webs, the material layer and the plastic layers, by lamination.

6. A method in accordance with claim 1, including:
   providing said markings by using magnetizable material.

7. A weblike paper product provided with markings which become visible upon transmission of light through said paper, comprising two layers of paper material defining side faces and a separate central transparent layer of material having printed markings, a plurality of plastic material bonding layers between said side faces and said central layer; said layers of paper material, the separate central transparent layer of printed markings and the bonding layer being joined together to form an integral laminated paper product.

8. A product as defined in claim 7, wherein said markings are magnetizable material.

9. A product as defined in claim 7, wherein both of the side faces of the layers of material are provided with markings.

10. A method of manufacturing paper having markings therein which become visible upon transmission of light through said paper, comprising the steps of:
    providing a first roll of paper material in the form of a first web having a first plastic material bonding layer on a side of the first web;
    providing a second roll of paper material in the form of a second web having a second plastic material bonding layer on a side of the second web;
    arranging the first and second webs with the first and second plastic bonding layers in facing relationship to each other;
    providing a separate transparent layer with said markings between said first and second webs; and
    compressing the first and second webs and the transparent layer together so as to provide an integral laminated paper web with the markings therebetween.

11. A method in accordance with claim 10, including:
    applying the markings by printing.

12. A method in accordance with claim 10, including:
    providing said markings by using magnetizable material.

* * * * *